United States Patent [19]

Lindberg

[11] Patent Number: 4,791,534
[45] Date of Patent: Dec. 13, 1988

[54] VEHICLE INCLUDING SUBSTANTIALLY TRANSPARENT HIGH MOUNTED STOP LIGHT

[76] Inventor: Victor L. Lindberg, 242 E. Middle St., Chelsea, Mich. 48118

[21] Appl. No.: 83,503
[22] Filed: Aug. 7, 1987
[51] Int. Cl.$^4$ .............................................. B60Q 1/26
[52] U.S. Cl. ...................................... 362/80; 340/98; 340/87; 350/171; 350/601; 362/327
[58] Field of Search ............... 362/61, 80, 327, 328, 362/74; 340/71, 72, 84, 87, 91, 97, 98; 350/97, 171, 601, 172

[56] References Cited

U.S. PATENT DOCUMENTS

| | | | |
|---|---|---|---|
| 3,436,758 | 4/1969 | Kluth | 340/97 |
| 4,040,726 | 8/1977 | Paca | 350/288 |
| 4,626,967 | 12/1986 | Sejoshi | 362/80 |

Primary Examiner—Ira S. Lazarus
Assistant Examiner—D. M. Cox
Attorney, Agent, or Firm—Reising, Ethington, Barnard, Perry & Milton

[57] ABSTRACT

A vehicle (10) includes a passenger compartment (22) having a driver's position. A rear window (18) is located at the rear of the passenger compartment and (22) defines a rear view line of vision from behind the driver's position. A light projecting assembly (34) is mounted adjacent the rear window (18) in a position offset from the rear view line of vision from the driver's position for projecting a brake light indicating beam (36) upon actuation by a brake light actuator mechanism. A semi-transparent beam splitting mirror (38) is disposed adjacent the rear window (18) and in the rear view line of vision from the driver's position for reflecting the brake light indicating beam (36) through the rear window (18) while presenting a substantially transparent window to the rear view line for vision from the driver's position.

11 Claims, 1 Drawing Sheet

U.S. Patent     Dec. 13, 1988     4,791,534 ial invention is generally shown at 10 in FIG. 1. The vehi-

VEHICLE INCLUDING SUBSTANTIALLY TRANSPARENT HIGH MOUNTED STOP LIGHT

TECHNICAL FIELD

The instant invention relates to a vehicle including a high mounted stop light assembly. More specifically, the present invention relates to vehicles including high mounted stop lights mounted in the rear window of the vehicle and located in the driver's rear view line of vision.

BACKGROUND ART

Beginning with the 1986 model year, the Federal Motor Vehicle Safety Standard no. 108 has required that all passenger vehicles have center high mounted stop lamps. Many vehicle models have the stop lamps adjacent the rear window and inside the vehicle. One disadvantage of this mounting position is that the lamp and its housing present a significant obstruction to vision through the rear window. This obstruction is significantly apparent if the driver is driving in reverse and observing through the rear view mirror or directly looking rearwardly. The obstruction caused by the lamp could easily hide a fixed or moving object located immediately to the rear of the automobile.

Presently manufactured high mounted rear brake light assemblies include a light source for projecting a red beam directly through the rear window. The light source is contained within a housing. The housing and light source present the obstruction to vision through the rear window.

SUMMARY OF THE INVENTION

In accordance with the present invention, there is provided a vehicle including brake means for braking the vehicle, brake light actuator means for actuating a brake light upon actuation of the brake means, and a passenger compartment including a driver's position. A rear window is located at the rear of the passenger compartment and defines a rear view line of vision from behind the driver's position. Light projecting means mounted adjacent the rear view window at a position offset from the rear view line of vision from the driver's position projects a brake light indicating beam upon actuation by the brake light actuator means. Transparent beam splitting means disposed adjacent the rear window and in the rear view line of vision from the driver's position reflects the brake light indicating beam through the rear window while presenting a substantially transparent window to the rear view line of vision from the driver's position.

FIGURES IN THE DRAWING

Other advantages of the present invention will be readily appreciated as the same becomes better understood by reference to the following detailed description when considered in connection with the accompanying drawings wherein:

FIG. 1 is a side elevational view of a vehicle constructed in accordance with the present invention;

FIG. 2. is an enlarged cross-sectional view of a brake light assembly constructed in accordance with the present invention; and FIG. 3 is a front view of the brake light assembly constructed in accordance with the present invention.

DETAILED DESCRIPTION OF THE DRAWINGS

Figure 1:
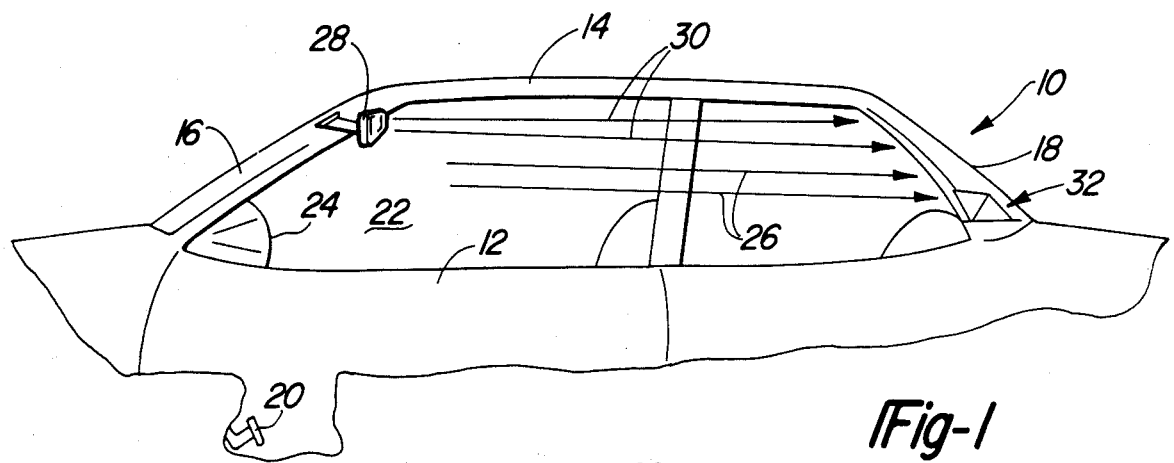

A vehicle constructed in accordance with the present invention is generally shown at 10 in FIG. 1. The vehicle is shown as an automobile including a body 12, roof 14, front window 16 and rear window 18. The vehicle 10 includes a brake pedal 20 which when depressed brakes the moving vehicle. Depression of the brake pedal 20 actuates a brake light actuator system for actuating the brake lights of the vehicle (not shown) upon actuation of the brake pedal 20. The vehicle 10 includes a passenger compartment 22 including a driver's position behind the steering wheel 24. The rear window 18 is located at the rear of the passenger compartment 22 and defines a rear view line of vision from behind the driver's position, indicated by arrows 26. There is also a rear view line of vision utilizing the rear view mirror 28, this line of vision indicated by arrows 30.

The vehicle 10 includes a brake light assembly generally shown at 32. The brake light assembly 32 is of the type for projecting an eye level brake-on indicating light beam through the rear window 18 of the vehicle 10. The brake light assembly 32 includes light projecting means generally indicated at 34 mounted adjacent the rear window 18 at a position offset from the rear view line of vision from the driver's position for projecting a brake light indicating beam, shown by arrows 36, upon actuation by the brake light actuator means. Transparent beam splitting means generally indicated at 38 is disposed adjacent the rear window 18 and in the rear view line of vision 26, 30 from the driver's position for reflecting the brake light indicating beam 36 through the rear window 18 while presenting a substantially transparent window to the rear view line of vision from the driver's position. Accordingly, the present invention provides a high mounted stop lamp including an offset brake-on indicating beam and a semi-transparent beam splitting means mounted within the driver's rear view line of vision which reflects the brake-on indicating beam rearwardly through the rear window 18 allows the remainder of the light beam to be transmitted therethrough. Upon actuation of the brake light, a brake-on indicating beam, such as a red beam, is rearwardly projected. But whether the brake-on indicating beam is on or off, a substantially clear window is presented to the driver's rear view line of vision. Therefore, the present invention provides a eye level high mounted brake light assembly which does not present an obstruction to the driver's rear view line of vision.

Figure 2:
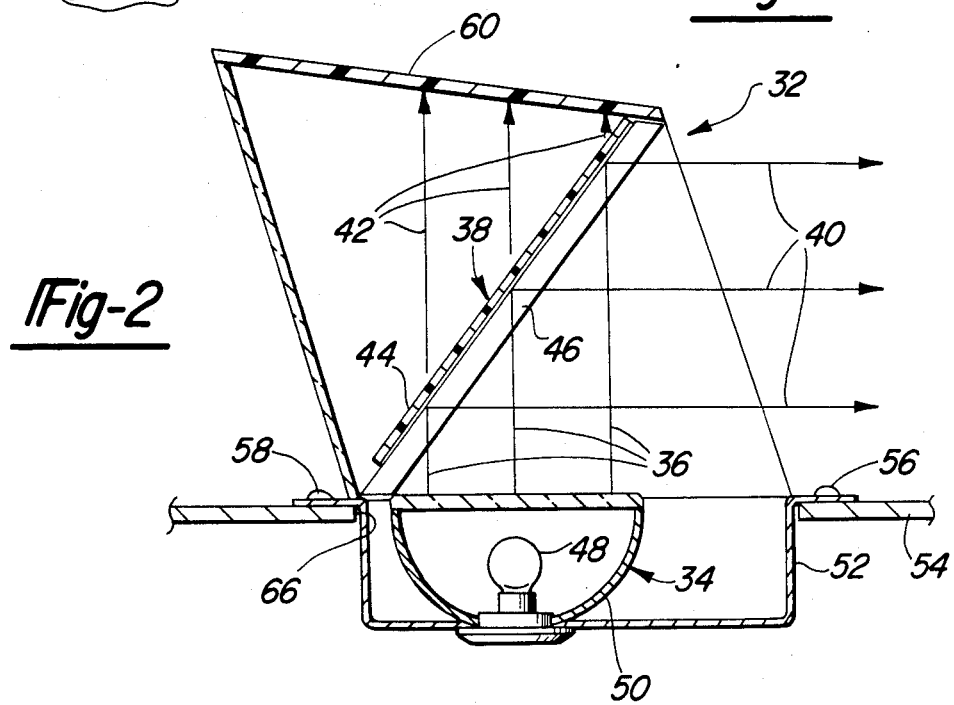

More specifically, the light projecting means 34 projects the brake-on indicating beam 36 on a beam path as shown in FIG. 2. The semi-transparent beam splitting means 38 includes a semi-transparent beam splitting mirror 38 mounted on the beam path and canted relative thereto. Canting of the mirror 38 is dependent upon the angle necessary to reflect the light beams 36 rearwardly through the rear window 18. The beam splitting semi-transparent mirror 38 includes means for reflecting beams in the red wavelength range, indicated by arrows 40 while transmitting all other light waves, indicated by arrows 42. Thusly, the red wavelength beams 40 are projected through the rear window 18 while all other light beams 42 are passed through the mirror 38.

Any beam splitting semi-transparent mirror may be utilized with the present invention. However, it is most desireable to utilize a mirror which transmits all light of wavelengths from 400 to 600 nanometers (all visible light except red light) and reflects light of wavelengths of 600 to 700 nanometers (red light). Ideally, it would be desireable to have a 100% transmittance of the non-red light and 100% reflectance for red light. There is commercially available a red reflective filter which approaches the ideal in these properties. This filter is made by OCLI of Santa Rosa, Calif. and has a transmittance (angled at 45°) of about 75% for non-red light and a reflectance of over 90% for red light. These filters are sold under the trade name "Colorband TM " color separation filters and is indicated as a red reflective filter having a transmittance equal to 50% at 580 nanometers, equal or greater than 85% average from 400 nanometers to 550 nanometers, and equal to or less than 1% average from 620 nanometers to 700 nanometers. The filter has a reflectance equal to or greater than 90% average from 610 nanometers to 725 nanometer. As shown in FIG. 2, the filter 44 can be applied to a glass support 46 as shown in FIG. 2 or to any other suitable transparent material, such as a plastic.

The light projecting means 34 is shown as an incandescent bulb 48 mounted in a housing 50. The housing 50 is mounted within a container 52 connected to the rear dashboard 54 of the vehicle 10 by mounting connectors 56 and 58. The incandescent bulb 48 can project a white beam as the mirror 38 would reflect the red wave lengths of the beam as rays 40 rearwardly while transmitting the remainder of the light beam as rays 42 therethrough. Alternatively, an LED light cluster can be utilized which transmits in the red range between 600 and 700 nanometer. This combination provides a high efficiently bright red braking beam.

Figure 3:
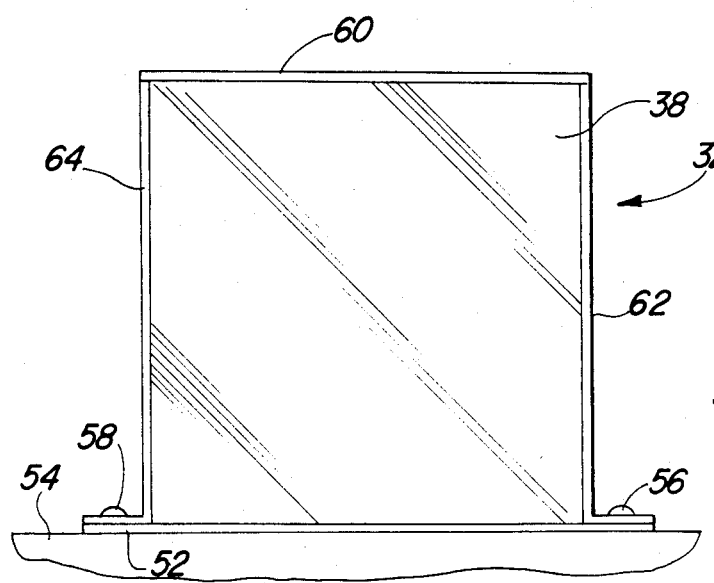

The assembly includes shield means for absorbing light projected by the light projecting means 34 and transmitted through the mirror 38 to prevent the projection of the transmitted beam from obstructing the driver's rear view line of vision. More specifically, the shield means includes a substantially flat shield member 60 disposed substantially perpendicular to the light beam path. The shield member 60 absorbs the light beams 42 transmitted through the mirror 38 which would otherwise show up as a bright reflected beam in the rear window 18. The bright beam itself could cause loss of critical vision for the driver. The shield member 60 absorbs the transmitted light beams 42 and is canted so as to not present any bright beam obstruction of the driver's rear view line of vision. Further, the shield member 60 is canted at an angle to present the least visible obstruction to the driver's rear view line of vision. Preferably, the shield member 60 is angled 5° coinciding with the angle of the rear view mirror rear view line of vision. By being canted to this specific angle, the shield member 60 presents only a straight line edge, as shown in FIG. 3 thereby minimizing any obstruction cause by the shield member 60.

The brake light assembly 32 includes side walls 62, 64 for providing support means for supporting the shield member 60 at the aforementioned angle parallel to the driver's rear view line of vision to present only the edge view of the shield member 60 to the driver's rear view line of vision.

The shield member 60 provides a top wall, which, in combination with the side walls 62 and 64, provide a housing for the brake light assembly 32. The side walls 62, 64 in combination with the shield member 60 and casing 52 provide a support for the mirror 38.

The housing assembly is adapted to be mounted in an opening 66 in the rear dash 54 of the vehicle 10. Alternatively, the light projecting means 34 could be mounted above the mirror 38, the mirror 38 being canted so as to receive the light beams from above and project the light beams rearwardly. It is a combination of the orientation of these elements which determines the necessary angle of the mirror 38 and positioning of the light projecting means 34.

In use, depression of the brake pedal actuates the brake light assembly 32 so that the bulb 48 projects light beams 36. The red beams 40 are reflected rearwardly while the remainder of the light beams 42 are transmitted through the mirror 38 and absorbed by the shield member 60. A red beam is visualized through the rear window 18. From the driver's position, a substantially clear window is presented, as shown in FIG. 3.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A vehicle (10) comprising: brake means (20) for braking the vehicle; brake light actuator means for actuating a brake light upon actuation of said brake means (20); a passenger compartment (22) including a driver's position; a rear window (18) located at the rear of the passenger compartment (22) defining a rear view line of vision from behind the driver's position; light projecting means (34) mounted adjacent said rear window (18) at a position offset from said rear view line of vision from said driver's position for projecting a brake light indicating beam (36) upon actuation by said brake light actuator means; and characterized by a semi-transparent beam splitting mirror (38) disposed adjacent said rear window (18) and in said rear view line of vision from said driver's position for reflecting the brake light indicating beams (26) through said rear window (18) while presenting a substantially transparent window to said rear view line of vision from said driver's position, said mirror (38) reflecting a predetermined wavelength range of light throughout the entire surface thereof and transmitting substantially all other wavelengths of light therethrough.

2. An assembly as set forth in claim 1 further characterized by said light projecting means (34) projecting the brake indicating beam (36) on a beam path, said semi-transparent beam splitting means (38) including a semi-transparent beam splitting mirror (38) mounted on said beam path and canted relative thereto.

3. A vehicle (10) comprising: brake means (20) for braking the vehicle; brake light actuator means for actuating a brake light upon actuation of said brake means (20); a passenger compartment (22) including a driver's position; a rear window (18) located at the rear of the passenger compartment (22) defining a rear view line of vision from behind the driver's position; light projecting means (34) mounted adjacent said rear window (18) at a position offset from said rear view line of vision from said driver's position for projecting a brake light indicating beam (36) upon actuation by said brake light actuator mean; semitransparent beam splitting means (38) disposed adjacent said rear window (18) and in said rear view line of vision from said driver's position; and shield means for absorbing light projected by said light projecting means (34) and transmitted through said mirror (38) to prevent the projection of the transmitted beam from obstructing the driver's rear view line of vision.

4. An assembly as set forth in claim 3 further characterized by said shield means including a substantially flat shield member (60) disposed substantially perpendicular to said beam path.

5. An assembly as set forth in claim 4 further characterized by including shield member support means (62, 64) for supporting said shield member (60) at an angle parallel to the driver's rear view of vision to present only an edge view of said shield member (60) to the driver's rear view line of vision.

6. An assembly as set forth in claim 5 further characterized by including a housing having a top wall defined by said shield member (60), side wall means (62, 64) for supporting said mirror (38), and base means (52) supporting said light projecting means (34) and adapted to be mounted in a rear dashboard (54) of said vehicle (10).

7. An assembly as set forth in claim 6 further characterized by said semi-transparent beam splitting means (38) transmitting visible non-red light of wavelengths from 400 to 500 nanometers and reflecting red light of wavelengths 600 to 700 nanometers.

8. An assembly as set forth in claim 7 further characterized by said semi-transparent beam splitting mean (30) having a transmittance for non-red light greater than 65 percent and a reflectance for red light of greater than 85 percent.

9. A brake light assembly (32) of the type to project an eye level brake-on indicating light beam through the rear window (18) of a vehicle (10), said assembly (32) comprising: light projecting means (34) adapted to be mounted at a position offset from a driver's rear view line of vision in the vehicle (10) for projecting a brake-on indicating beam; semitransparent beam splitting means (38) adapted to the disposed adjacent the vehicle rear window (18) and in the driver's line of vision for reflecting the brake-on indicating beam through the rear window (18) while providing a substantially transparent window in the driver's rearward line of vision; and shield means for absorbing light projected by said light projecting means (34) and transmitted through said mirror (38) to prevent the projection of the transmitted beam from obstructing the driver's rear view line of vision.

10. A vehicle (10) comprising: brake means (20) for braking the vehicle; brake light actuator means for actuating a brake light upon actuation of said brake means (20); a passenger compartment (22) including a driver's position; a rear window (18) located at the rear of the passenger compartment (22) defining a rear view line of vision from behind the driver's position; light projecting means (34) mounted adjacent said rear window (18) at a position offset from said rear view line of vision from said driver's position for projecting a brake light indicating beam (36) upon actuation by said brake light actuator means, and characterized by a semi-transparent beam splitting mirror (38) disposed adjacent said rear window (18) and in said rear view line of vision from said driver's position for reflecting the brake light indicating beams (26) through said rear window (18) while presenting a substantially transparent window to said rear view line of vision from said driver's position, said light projecting means (34) projecting the brake indicating beam (36) on a beam path, said semi-transparent beam splitting mirror (38) including a semi-transparent beam splitting mirror (38) mounted on said beam path and canted relative thereto, said semi-transparent beam splitting means (38) transmitting visible non-red light of wavelenghts from 400 to 600 nanometers and reflecting red light of wavelenghts 600 to 700 nanometers.

11. A brake light assembly (32) of the type to project an eye level brake-on indicating light beam through the rear window (18) of a vehicle (10), said assembly (32) comprising: light projecting means (34) adapted to be mounted at a position offset from a driver's rear view line of vision in the vehicle (10) for projecting a brake-on indicating beam; a semi-transparent beam splitting mirror (38) adpated to be disposed adjacent the vehicle rear window (18) and in the driver's line of vision for reflecting the brake-on indicating beam through the rear window (18) while providing a substantially transparent window in the driver's rearward line of vision; and shield means for absorbing light projected by said light projecting means (34) and transmitted through said mirror (34) to prevent the projection of the transmitted beam from obstructing the driver's rear view line of vision.

* * * * *